United States Patent

[11] 3,615,974

[72] Inventor Roderich W. Graff
 Kollwitzweg 19, Darmstadt-Arheilgen, Germany
[21] Appl. No. 743,204
[22] Filed July 8, 1968
[45] Patented Oct. 26, 1971
[32] Priority July 6, 1967
[33] Australia
[31] 6289/67

[54] METHOD OF MAKING PLATE-SHAPED STRUCTURAL ELEMENTS FILLED WITH EXPANDED MATERIAL
 6 Claims, 11 Drawing Figs.
[52] U.S. Cl. .................................................... 156/79, 156/197, 156/290
[51] Int. Cl. ...................................................... B32b 5/18, B31d 3/02
[50] Field of Search ........................................... 161/119, 120, 139, 121, 122; 156/79, 197, 290; 264/121, 122

[56] References Cited
UNITED STATES PATENTS
| | | | |
|---|---|---|---|
| 2,744,042 | 5/1956 | Pace | 156/79 X |
| 2,748,048 | 5/1956 | Russell | 156/197 X |
| 3,006,798 | 10/1961 | Holland | 156/197 |

Primary Examiner—Leland A. Sebastian
Assistant Examiner—S. R. Hellman
Attorney—Michael S. Striker ABSTRACT: A structural element and a method of making the same. A plate member consists of a material having inherently low bending resistance and is provided with a plurality of spaced reinforcing ribs which project from at least one major surface of the plate member. The ribs are hollow and define internal passages. Bodies of solidified flowable material are introduced into and fill these passages for the purpose of reinforcing the ribs and thereby the plate member.

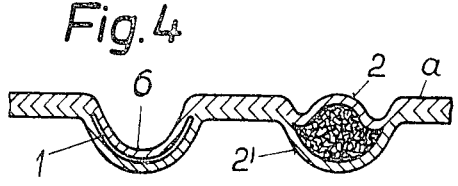
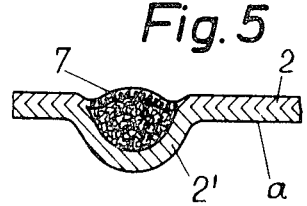
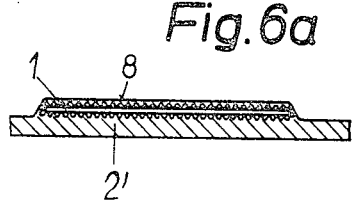
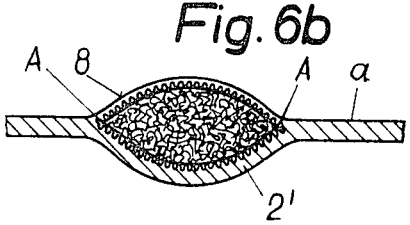
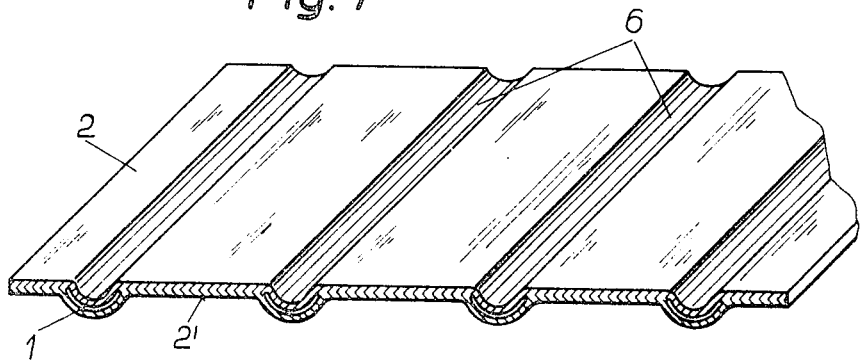
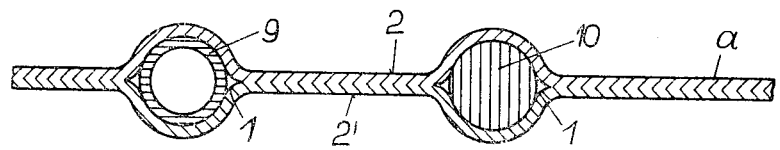
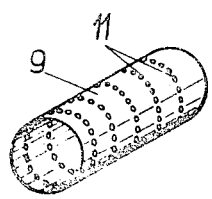

METHOD OF MAKING PLATE-SHAPED STRUCTURAL ELEMENTS FILLED WITH EXPANDED MATERIAL

BACKGROUND OF THE INVENTION

The present invention relates to structural elements in general, and particularly to plate-shaped structural elements. Still more particularly the invention relates to plate-shaped structural elements consisting of synthetic plastic materials.

It is well known that so-called thermostat synthetic plastic materials, even if they are fiber-reinforced, have a rather low modulus of elasticity as compared to metallic materials. This makes it difficult to manufacture from such plastic materials structural elements of small wall thickness but nevertheless sufficient bending resistance, that is stiffness. However, materials of this type have been found particularly advantageous for a great variety of applications, because of their corrosion resistance and other favorable characteristics of the plastic materials, and it is therefore not simply feasible to avoid the manufacture of thin-walled plate-shaped structural elements from plastic materials and to substitute other materials therefor.

Thus, attempts have been made to improve the stiffness of thin-walled plate-shaped structural elements made from duroplastic synthetic plastic materials. One approach is to make such elements, for instance glass fiber reinforced polyester plates, in corrugated form. However, corrugations are not suitable for all purposes because in many instances it is necessary that the plates be planar or substantially planar. Another approach at reinforcing this type of structural element but without providing it in corrugated form, resides in providing the wall of the structural element with spaced empty passages which are formed into reinforcing profiles. In the direction transversely of the elongation of the reinforcing passages, which might actually be better described as reinforcing ribs which are hollow, structural elements of this type are relatively resistant to bending. As compared with the corrugated type of element, they require less material for an element of identical size and bending resistance. The latter can be further enhanced by inserting reinforcing rods into the hollow passages. This construction would therefore seem to meet the requirements which are made of it; unfortunately, however, it is not possible to manufacture this type of plate economically and in sufficiently great lengths as seen in the direction of elongation of the passages and reinforcing ribs.

It is therefore a general object of the invention to overcome the disadvantages known from the prior art.

A further object of the invention is to provide an improved plate-shaped structural element having the characteristics which have been set forth above as desirable and being possessed of none of the disadvantages known from the existing types of such elements.

A further object of the invention is to provide also a method of making such elements.

SUMMARY OF THE INVENTION

In accordance with the above objects, and others which will become apparent hereafter, one feature of my invention resides in the provision of a plate-shaped structural element wherein a plate member consists of the material having inherently low bending resistance and is provided with a plurality of spaced reinforcing ribs which project from at least one major surface of the plate member. These ribs are hollow and define internal passages. In accordance with my invention, bodies of solidified flowable material fill these passages for the purpose of reinforcing the ribs and thereby the plate member.

Such flowable material may be synthetic plastic foams, or pumpable or pourable material, including concrete or the like.

To produce my novel structural element I first make a plate member consisting of at least two stacked, that is superposed, layers of synthetic plastic material, advantageously a resin-impregnated fibrous material to thereby obtain a laminate. In those regions where the ribs are to be subsequently produced, I embed either a flattened hose of synthetic plastic material or strips or ribbons of synthetic plastic material which do not bend to the impregnating resin used. This prevents the two layers from adhering in hose regions and, after they undergo the necessary heat treatment in conventional manner, the nonadhered elongated areas are expanded by introducing the flowable material mentioned above under pressure, whereby the overlying portions of the respective layers are outwardly expanded so that at least one major surface of the element is provided with profiled elongated reinforcing ribs which are in themselves held in place and internally reinforced by the solidified flowable material.

By resorting to my invention the novel plate-shaped structural element can be produced on the existing continuously operating machines, thus not only making it possible to produce the structural element in quantities but also avoiding the necessity for expenditures for new machines. Evidently, the plate member constructed from the two or more layers of adhered synthetic plastic laminate need not be converted at once into the final plate-shaped structural element. In other words, it may be left completely planar without any expansion of the reinforcing ribs and without the introduction of flowable material into the thus-provided spaces. This makes it much easier to transport the thus semifinished plate members and the expansion of the ribs and introduction of the flowable material for reinforcing purposes can take place at the time and at the location of final use. It should be understood that this expansion of the ribs is possible even after the synthetic plastic material of the plate member has hardened because of the low modulus of elasticity of the resins which are used for constructing such plate members. The same holds true, of course, for the embedments, for instance the embedded flat synthetic plastic which are subsequently to be expanded. Such a hose, having for example a width of between 5 and 15 centimeters can be easily expanded to constitute an almost cylindrical profile even if the wall thickness of the layers of laminate in which it is embedded ranges to approximately 3 millimeters.

It will be appreciated that the cross-sectional configuration of the expanded ribs, assuming an initially flat plate member with the embedments located centrally between the opposite major surfaces of the plate member, is dependent upon the thickness of the layers of laminate which are being used and the particular characteristics of the material which is employed for the expansion. For instance, if one introduces a polyurethane foam into the embedded flat plastic hose, which foam undergoes its foaming action and expansion within the flat plastic hose, then the finally resulting cross-sectional configuration of the expanded plastic hose and therefore of the final reinforcing rib, depends upon the type of foam, the quantity of foam introduced and the conditions of foaming which exist. This of course makes it difficult to obtain a precisely determined cross-sectional configuration for the expanded reinforcing rib. In accordance with a recurrently preferred embodiment of my invention I therefore so preform the flat plate member that the expansion of the embedments will take place in only one direction. This I can obtain by forming the layers of laminate prior to hardening with depressions which are of substantially arcuate cross section and are coextensive with the embedments which latter are located in the arcuate portion of the depressions. When the embedments are subsequently inflated, only the inner major surface of the structural element changes, that is. The other major surface on which the provision of the arcuate recesses or depressions has provided corresponding elongated ridges, remains unchanged and therefore retains its original precisely predetermined configuration.

In the event that it is desired to maintain one of the major surfaces of the structural element completely planar, I can obtain this by so selecting the thickness of the laminar layer in the region of the embedments, particularly in the region of the inner surface of the groove-shaped indentations, that on expansion the material will not project beyond the planar surface. This can also be obtained by suitably selecting the width of the embedment with respect to the transversal width of the indented groove, or by a combination of these two approaches. Evidently, structural elements so configured are particularly advantageous for certain applications, for example as covers for greenhouse constructions or the like. It will be appreciated that the watertight surface layer of such structural elements is integral with the reinforcing supports, which are of course here constituted by the reinforcing ribs, so that there is no need for securing one to the other as is conventionally necessary. This not only eliminates expenses for additional materials and labor, but also makes such plates particularly watertight because there is of course no need for puncturing or aperturing as is necessary to secure conventionally constructed synthetic plastic elements to their supports of wood or metal.

It is possible that under some circumstances the expansion of the embedments might lead to tearing of the bonded laminar layers in which the embedments are provided. Such tearing would take place at the opposite lateral margins of the embedments. To avoid this the embedments may be wrapped into reinforcing webs or mats, such as silver or fabric, for example glass fiber fabric, prior to being embedded between the layers of laminate. On subsequent adhering of these layers to one another the resin will bond with improved strength with the fiber material surrounding the embedments.

Also, to further increase the stiffness and particularly the tensile strength, wires or narrow ribbons may be embedded, consisting of a material having a higher modulus of elasticity than the plate member itself. For example, a metal may be used for this purpose and will be introduced along with the embedments between the layers constituting the plate member, extending along the embedments. For example, such reinforcing tapes or wires may be packed into the fibrous wrap mentioned above, along with the embedments themselves.

As far as the solidifiable flowable material is concerned which is introduced into the embedments to expand the same, it should be understood that a great variety of suitable materials is suitable for this purpose. For example, the various known synthetic plastic foams such as polyurethane foam or phenol foam can be used, whether filled or unfilled, are suitable. Other materials which can be used are so-called glass foam and analogous materials, or concrete which may or may not be itself reinforced. Sliver or fibrous webs for the purposes mentioned above may be provided in form of glass fibers, either in form of mats or fabrics. Synthetic plastic resins which are particularly suitable are polyester resins and epoxy resins because these are especially economical to use. As far as the embedments are concerned, all materials are suitable which are resistant to the synthetic plastic resins used for the layers of laminate. It should also be pointed out that the glass fiber mats or fabrics mentioned above are also suitable for constructing the layers of laminate themselves. The embedments may consist of polyvinyl alcohol, polypropylene, polyamide, polyester or the like, and may be either removed prior to expansion of the spaces into reinforcing ribs, or they may be left. If they are removed they are advantageously simply constructed in form of flat ribbons which do not adhere to the surrounding layers of laminate so that they can be withdrawn. If they are to be left in place, it is particularly advantageous to use hoses or lay-flat tubes, or foils which will bond with the surrounding layers of laminate, for instance polyvinyl fluoride, acetobutyrate or the like, materials which will bond with many of the polyester resins.

The filling and expanding of the spaces which are produced in the plates will depend on the type of material which is being used for the filling and expanding purposes. If synthetic plastic foams are used, such as polyurethane foam, one end of the space will be closed and the material will be introduced from the other end into the space between the two superimposed strips of tape or into the flat synthetic plastic hose. A predetermined quantity of such material will be introduced, the other end of the space will also be closed, and the foaming action will be allowed to take place during which the expansion into a reinforcing rib takes place. The foam solidifies and constitutes with the surrounding material a solid cross section profile. If it is desired to obtain a particularly exact cross section of the profile, then the structural element, or the part thereof in which the rib currently being expanded is located, may be introduced between two mold sections prior to the foaming operation.

If other materials such as concrete are used, they must be introduced under pressure by means of suitable pumps or the like, and then be allowed to harden. It is also possible to use inserts of wood, steel or the like, whether massive or hollow, for the expansion.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 4 illustrates a further embodiment of the invention in a view similar to FIG. 3;

FIG. 5 illustrates yet another embodiment of the invention in a view reminiscent of FIG. 4;

FIG. 6a is a cross-sectional view illustrating a further embodiment of the invention in diagrammatic form;

FIG. 6b is a view of FIG. 6a after expansion of the reinforcing rib;

FIG. 7 is a view similar to FIG. 1 but illustrating a structural element of the type shown in FIGS. 3–5;

FIG. 8 is a view similar to FIG. 2b but illustrating a further embodiment of the invention; and FIG. 9 is a perspective view of an expansion member for use with the embodiment of FIG. 8.

DESCRIPTION OF THE PREFERRED EMBODIMENTS

Figure 1:
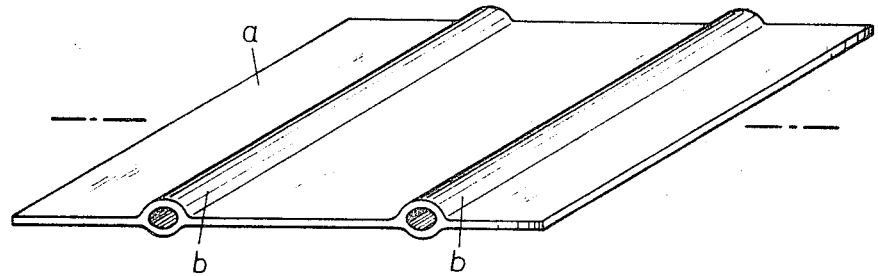
FIG. 1 is a somewhat diagrammatic perspective view of a plate embodying the invention.
Figure 2A:
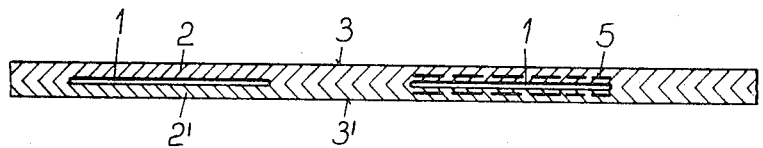
FIG. 2a is a cross section on the line I—I of FIG. 1, on a somewhat enlarged scale, and taken before the expansion of the reinforcing ribs in FIG. 1.

Discussing now the drawing in detail, and firstly FIG. 1 thereof, it will be seen that this is a somewhat diagrammatic illustration of a structural element embodying the invention. It is assumed to be a plate *a* consisting of two or more superimposed and bonded layers of fiber-reinforced thermoset synthetic resin, which is formed with two integral substantially tube-shaped reinforcing ribs or profiles *b*. The filler material therein is not illustrated. FIG. 2a illustrates the appearance of the structural element of FIG. 1 prior to expansion of the reinforcing profiles *b*. In FIG. 2a it will be seen that two flat hoses or tubes 1 of synthetic plastic material are embedded between two layers 2, 2' of synthetic resin laminate. Release foils covering the opposite major surfaces of the layers 2, 2' are identified with reference numerals 3, 3'. In FIG. 2 the right-hand embedded hose 1 is illustrated somewhat differently from the one shown in the left hand of this Figure. Specifically, longitudinally extending flat metal ribbons 5 are shown to be embedded at the opposite sides of the hose 1 at the right-hand side of FIG. 2a, intermediate the hose 1 and the respective major surfaces of the layers 2, 2'. These ribbons or strips 5 serve for reinforcing purposes. It will be appreciated that they can also be associated with the left-hand hose 1, or that they can be omitted.

Figure 2B:
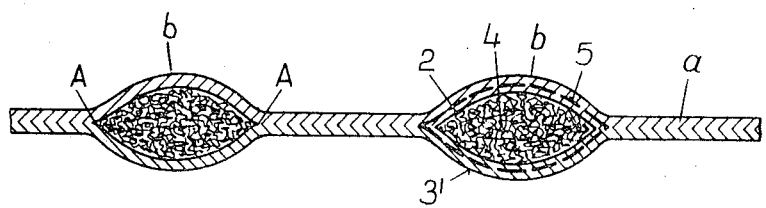
FIG. 2b is a cross section on the line I—I of FIG. 1 but taken after the expansion of the ribs has taken place.

FIG. 2b shows the construction of FIG. 2a after its expansion. In this embodiment it is clearly visible how a foam plastic material 4 has been introduced into the interior of the respective hoses 1, and how the foaming and expansion of this material 4 has accordingly expanded the reinforcing ribs b.

In FIG. 2b the areas particularly subject to stresses upon expansion are indicated with A.

Figure 3:
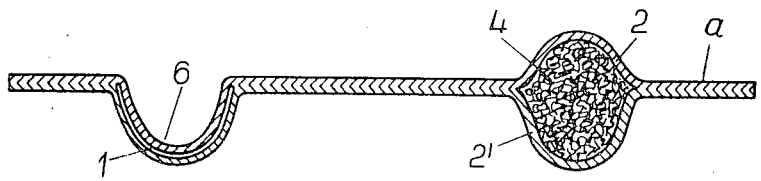
FIG. 3 is a view similar to FIG. 2a but illustrating another embodiment of the invention.

In FIG. 3 the plate a is assumed to be constructed of laminar layers in the manner shown in FIG. 2a. However, here the plate a is formed with the elongated grooves or recesses 6 extending along the embedded hoses 1. The formation of the grooves 6 on the side of the layer 2 provides corresponding projections on the side of the layer 2' as is clearly visible in FIG. 3. On expansion of the embedded hoses 1, as shown in the right-hand side of FIG. 3, such expansion will take place only towards the side of the layer 2, that is the side where the grooves are provided, and on the side of the layer 2' where the projections are provided there will be no change in the specific preformed configuration of these projections. Thus, the configuration and appearance of the plate a on the side of the layer 2' can be preselected and will not be effected by the expansion of the hoses 1.

FIG. 4 is a view similar to FIG. 3 but illustrating an embodiment where it is desired that on expansion of the hoses 1 the ribs should not project beyond the general plane of the plate and the side of the layer 2. By comparison with the left-hand side of FIG. 4 and the left-hand side of FIG. 3 it will be seen that here in FIG. 4 the transverse width of the embedded hoses 1 is smaller than the transverse width of the wall surface bounding the groove 6. This assures that, when the hose 1 is expanded as shown by the example of the right-hand side of FIG. 4, the inner surface bounding the groove 6 will not project outwardly beyond the major plane of the plate a at the side of the layer 2. Thus, this side will remain planar, as is desired for certain applications.

FIG. 5 shows an embodiment which provides a particular stiffness. It will be appreciated that that layer of the plate a which must not be expanded can be selected as thick as desired. In FIG. 5 the configuration of the plate a is the same as that shown in FIG. 4 or in FIG. 3, except that the layer 2' is considerably thicker than the layer 2 in the embodiment of FIG. 5. To give the relatively thin layer 2 added tensile strength it is here shown reinforced by suitable embedments, for instance embedded metallic wires 7.

In the embodiment of FIG. 6a I have illustrated how the hoses 1 can be provided with reinforcing means other than the one shown in FIG. 2b. The reinforcing means of FIG. 6a are effective for reinforcing the layers 2 and 2' against stresses acting in the regions A of FIG. 2b. As shown in FIG. 6a, the hose 1 may be surrounded with a reinforcing mat or a reinforcing textile 8, for instance glass fiber material. This is shown here overlying the layer 2'. The layer 2 has been omitted, it being understood that it also could be applied over the layer 2' and the hose 1 with its reinforcing fabric 8. FIG. 6b shows the reinforcing mat 8 bonded to the layer 2' to provide the plate a. The hose 1 is shown expanded in the manner discussed before, for instance by introduction of a foam-type synthetic plastic material, and it will be seen how the reinforcing fabric 8 bonds with the layers 2' and the layer 2 in case this is applied also and reinforces the plate a against tearing at the regions A.

FIG. 7 shows in a fragmentary perspective view a plate-shaped structural element of the type discussed with respect to FIGS. 3–6, but prior to expansion of the embedded hoses 1. The grooves 2 are clearly visible. Such a structural element can advantageously be produced on a machine used for producing conventional corrugated synthetic plastic plates or elements. Machines of this type produce these corrugated elements continuously with the corrugations, or as in FIG. 7 with the grooves 6, extending transversely to the direction of advancement of the plates. In other words, the corrugations or the grooves 6 will extend transversely of the direction of the continuously produced strip which is subsequently severed into smaller-sized elements. Such machines are capable of producing the laminated strips of various different sizes, for instance in a width ranging between 3 and 6 meters and a length ranging between 30 and 60 meters. Such strips are rolled for storage purposes. They can then be transported to the place of use and portions of desired size can be severed, whereupon the embedded hoses 1 are expanded in the manner discussed before. One obtains in this way a stiff self-supporting plate which may for example have a size of 6×30 meters and which has no perforations, apertures or the like of any type so that it is completely watertight. Such structural elements are eminently well suited as roofing for greenhouses, enclosures for covered swimming pools, storage buildings or the like.

Coming, finally, to the embodiment of FIG. 8 it will be seen that it is possible to effect expansion of the hoses 1 not only by means of flowable materials directly, but that they can be preexpanded if desired. For this purpose a hollow steel tube 9 (left-hand side of FIG. 8) or a solid wooden or other core 10 (right-hand side of FIG. 8) is introduced into the respective hose 1, effecting its expansion as planned. Subsequently, the core 10 can be withdrawn and the flowable material introduced. In the case of the tube 9, FIG. 9 shows that this may be advantageously perforated, with the perforations identified with reference numeral 11. In this case the flowable material, for instance foam material, such as polyurethane foam, is introduced into the interior of the tube 9. Upon introduction into the steel tube 9, this material will then foam and expand, filling first the interior of the steel tube 9 and penetrating through the apertures 11 so as to flow in the interstices between the steel tube 9 and the surrounding hose 1. This provides an intimate bonding of the steel tube 9 with the hose 1 and therefore with the layers 2 and 2', and at the same time serves to protect all surface portions of the steel tube 9 against corrosion.

It sill be understood that each of the elements described above, or two or more together, may also find a useful application in other types of constructions differing from the types described above.

While the invention has been illustrated and described as embodied in a plate-shaped structural element of synthetic plastic material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A method of making plate-shaped structural elements, comprising the steps of stacking at least two layers of fiber-reinforced synthetic plastic laminate in surface-to-surface contact of their respective juxtaposed surfaces; bonding said layers together at said surfaces while simultaneously preventing such bonding in a plurality of relatively narrow elongated zones to thereby obtain respective internal passages in the thus-obtained plate member; filling said internal passages with quantities of solidifiable expandable material in flowable state; and exerting with said expandable material outwardly directed pressure in said passages whereby to expand said plate member in the region of said passages for obtaining projecting ribs filled with said solidifiable material and reinforcing said plate member when such material solidifies.

2. A method as defined in claim 1, comprising the step of inserting into said passages respective perforated tubes for thereby moving said layers apart in said zones; and introducing said flowable material into said tubes to fill the latter and penetrate through the perforations thereof so as to fill interstices surrounding the tubes and further expand said plate member in said zones for obtaining said ribs.

3. A method as defined in claim 1, and comprising the step of disposing between said layers in said zones prior to bonding of the surfaces to one another, types of a material which does not bond with said layers.

4. A method as defined in claim 1, said plate member having two major outwardly direct surfaces; and further comprising the step of forming said plate member before expanding prior to expanding with grooves indented inwardly of one of said major surfaces and extending in direction of said zones coextensively therewith.

5. A method as defined in claim 4, wherein the thickness of one of said layers at least in the region of said zones is less than the thickness of the other layer to assure that on expansion of the material of said plate member said ribs expand only in direction of the major surface associated with said one layer.

6. A method as defined in claim 6, wherein said one layer is provided with said one major surface, and wherein the thickness of said one layer is less than the thickness of the other layer at least in the region of the respective grooves indented inwardly of said one major surface.

* * * * *

UNITED STATES PATENT OFFICE
CERTIFICATE OF CORRECTION

Patent No. 3,615,974                           Dated   October 26, 1971

Inventor(s) Roderich W. Graff

It is certified that error appears in the above-identified patent and that said Letters Patent are hereby corrected as shown below:

On the cover sheet [33] "Australia" should read -- Austrian -- .

Signed and sealed this 14th day of November 1972.

(SEAL)
Attest:

EDWARD M. FLETCHER, JR.                ROBERT GOTTSCHALK
Attesting Officer                      Commissioner of Patents